US012792499B2

(12) United States Patent
Dovlekaev et al.

(10) Patent No.: US 12,792,499 B2
(45) Date of Patent: Nov. 10, 2026

(54) EVALUATING A FLOATING-POINT ACCURACY OF A COMPILER

(71) Applicant: Mobileye Vision Technologies Ltd., Jerusalem (IL)

(72) Inventors: Vladislav Dovlekaev, Tal-el (IL); Boaz Ouriel, Zichron Ya'akov (IL); Simone Fabris, Tel Aviv (IL); Yosef Kreinin, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/623,351

(22) PCT Filed: Mar. 31, 2021

(86) PCT No.: PCT/IB2021/000236

§ 371 (c)(1),
(2) Date: Dec. 28, 2021

(87) PCT Pub. No.: WO2021/198789

PCT Pub. Date: Oct. 7, 2021

(65) Prior Publication Data

US 2023/0297497 A1 Sep. 21, 2023

Related U.S. Application Data

(60) Provisional application No. 63/003,500, filed on Apr. 1, 2020.

(51) Int. Cl.
*G06F 11/3668* (2025.01)
*G06F 8/41* (2018.01)

(52) U.S. Cl.
CPC ............ *G06F 11/3696* (2013.01); *G06F 8/47* (2013.01)

(58) Field of Classification Search
CPC ............................... G06F 8/47; G06F 11/3696
(Continued)

(56) References Cited

U.S. PATENT DOCUMENTS 6,789,098 B1 * 9/2004 Dijkstra .................. G06F 7/026 708/200
6,901,422 B1 * 5/2005 Sazegari ............... G06F 9/3001 708/607

(Continued)

FOREIGN PATENT DOCUMENTS

WO WO-2021198789 A1 10/2021

OTHER PUBLICATIONS

"International Application Serial No. PCT/IB2021/000236, International Search Report mailed Aug. 5, 2021", 4 pgs.

(Continued)

*Primary Examiner* — Bradford F Wheaton
(74) *Attorney, Agent, or Firm* — Schwegman Lundberg & Woessner, P.A.

(57) ABSTRACT

A mechanism for evaluating a floating-point accuracy of a vehicle driving compatible compiler includes testing code compiled by a vehicle driving compatible compiler with code compiled by a testing environment compatible compiler, executing the vehicle driving compatible compiled code involves executing addition type floating points operations to provide a first floating point result, executing the testing environment compatible compiled code to perform addition type floating points operations to provide a second floating point result that corresponds to the first floating point result, comparing the first floating point result to the second floating point results to provide a comparison result, and determining the floating-point accuracy of vehicle driving compatible compiler based on the comparison result.

23 Claims, 6 Drawing Sheets

(58) Field of Classification Search
USPC .......................................................... 717/124
See application file for complete search history.

(56) References Cited

U.S. PATENT DOCUMENTS

| | | | | |
|---|---|---|---|---|
| 10,216,512 | B1 * | 2/2019 | Mathew | G06F 8/41 |
| 10,289,409 | B2 * | 5/2019 | Mandava | G06F 8/71 |
| 10,474,563 | B1 * | 11/2019 | Rai | H04L 67/101 |
| 2006/0136131 | A1 * | 6/2006 | Dugan | G07B 15/02 705/13 |
| 2007/0250814 | A1 * | 10/2007 | Bendapudi | G06F 11/3648 717/124 |
| 2013/0007412 | A1 * | 1/2013 | Krishnamurthy | G06F 15/76 712/30 |
| 2013/0152048 | A1 * | 6/2013 | Sato | G06F 11/2236 717/124 |
| 2013/0205282 | A1 * | 8/2013 | Lafreniere | G06F 9/45504 717/139 |
| 2015/0293952 | A1 * | 10/2015 | Ogrinz | G06F 16/27 707/702 |
| 2016/0062746 | A1 * | 3/2016 | Chiosi | H04L 41/0843 717/104 |
| 2020/0137580 | A1 * | 4/2020 | Yang | H04W 4/44 |
| 2020/0365044 | A1 * | 11/2020 | Trim | G09B 9/04 |
| 2021/0055919 | A1 * | 2/2021 | Malik | G06F 8/433 |

OTHER PUBLICATIONS

"International Application Serial No. PCT/IB2021/000236, Written Opinion mailed Aug. 5, 2021", 9 pgs.

"Proceedings of the SIGNUM conference on the programming environment for development of numerical software", SIGNUM Newsletter, ACM, 2 Penn Plaza, Suite 701 New York NY 10121-0701 USA, vol. 14, No. 1, (Mar. 1, 1979).

Laura, Titolo, et al., "Automatic generation and verification of test-stable floating-point code", arxiv.org, Cornell University Library, 201 Olin Library Cornell University Ithaca, NY 14853, 3 A Denotational Semantics for Floating-Point Programs, (Jan. 7, 2020).

Uguen, Yohann, et al., "Bridging high-level synthesis and application-specific arithmetic: The case study of floating-point sunmations", 2017 27th International Conference on Field Programmable Logic and Applications (FPL), Ghent University, (Sep. 4, 2017).

* cited by examiner

EVALUATING A FLOATING-POINT ACCURACY OF A COMPILER

CLAIM TO PRIORITY

This patent application is a U.S. National Stage Application under 35 U.S.C. 371 from International Application No. PCT/IB2021/000236, filed Mar. 31, 2021, and published as WO 2021/198789 on Oct. 7, 2021, which claims the benefit of priority to U.S. Provisional Patent Application Ser. No. 63/003,500, filed on Apr. 1, 2020, which are incorporated herein by reference in their entirety.

BACKGROUND

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc.

As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW), and traffic sign recognition (TSR), as opposed to fully autonomous driving. In various embodiments, the system may include one, two or more cameras mountable in a vehicle and an associated processor that monitor the environment of the vehicle. In further embodiments, additional types of sensors can be mounted in the vehicle and can be used in the autonomous navigation and/or driver assist system. In some examples of the presently disclosed subject matter, the system may provide techniques for processing images of an environment ahead of a vehicle navigating a road for training a neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided systems, methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
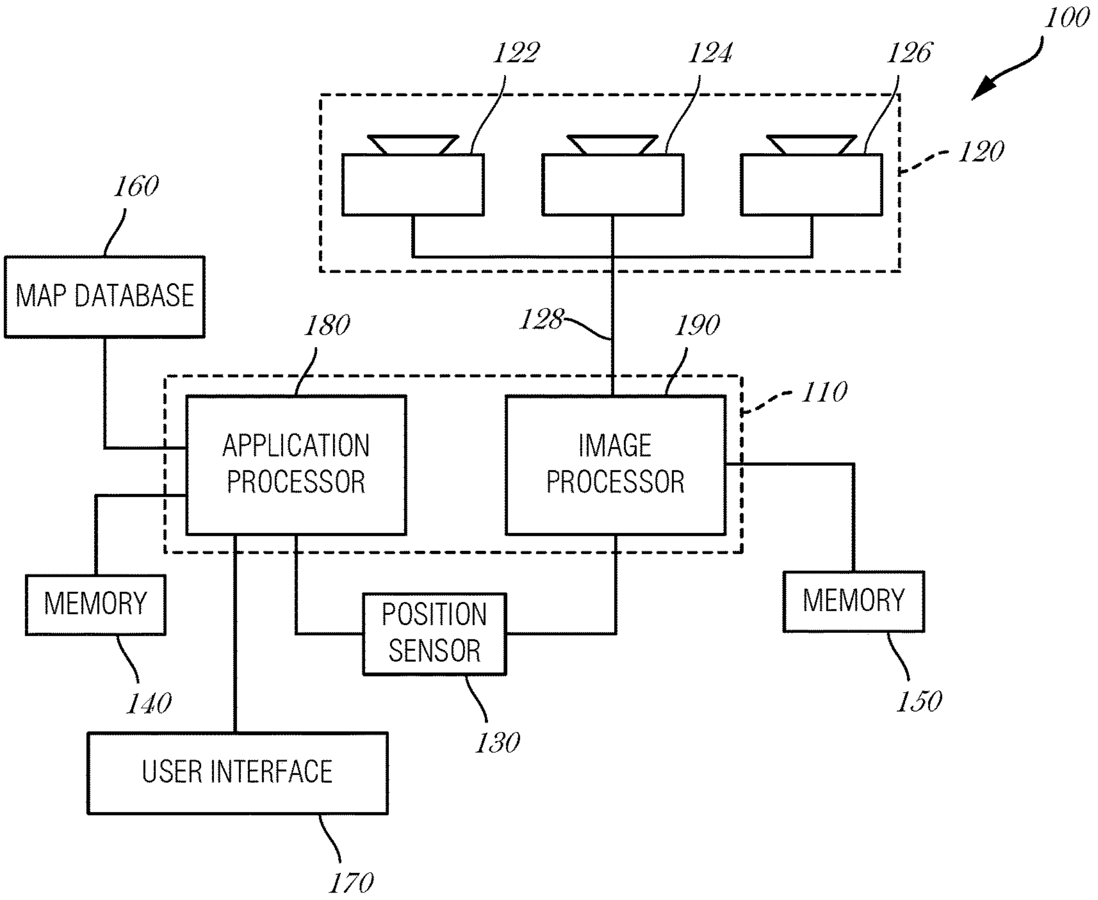
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device. For example, there may be provided a method and/or method steps executed by the image processor described in any one of claims. For example, there may be provided a method and/or method steps executed by the image processor described in any one of claims.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A pixel may be a picture element obtained by a camera or may be a processed picture element.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data and also from data that is not image-based or is not exclusively image-based, as well.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition units and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32@34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2A-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
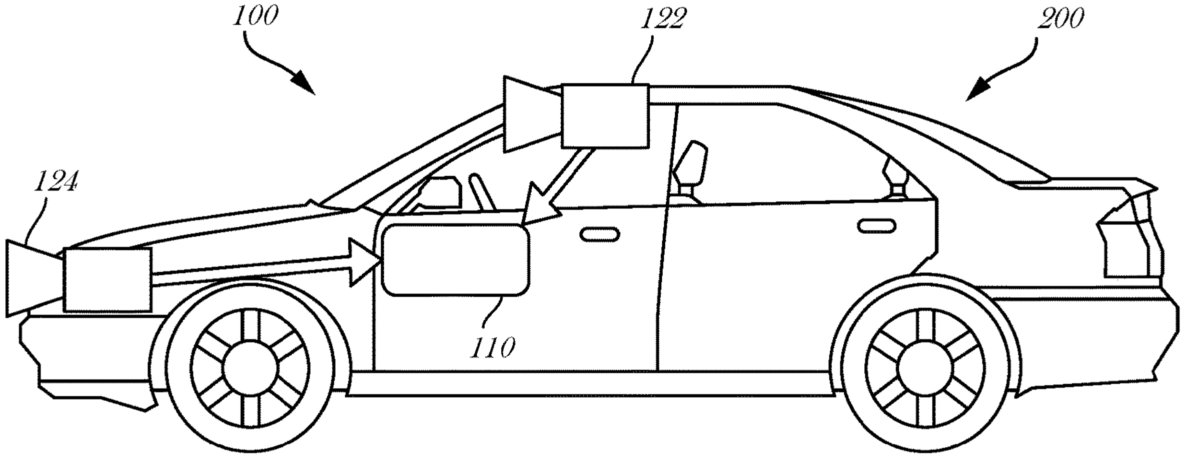
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2A-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image acquisition unit 120, or an image capture device that is one of a plurality of image capture devices that are used in an image acquisition unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
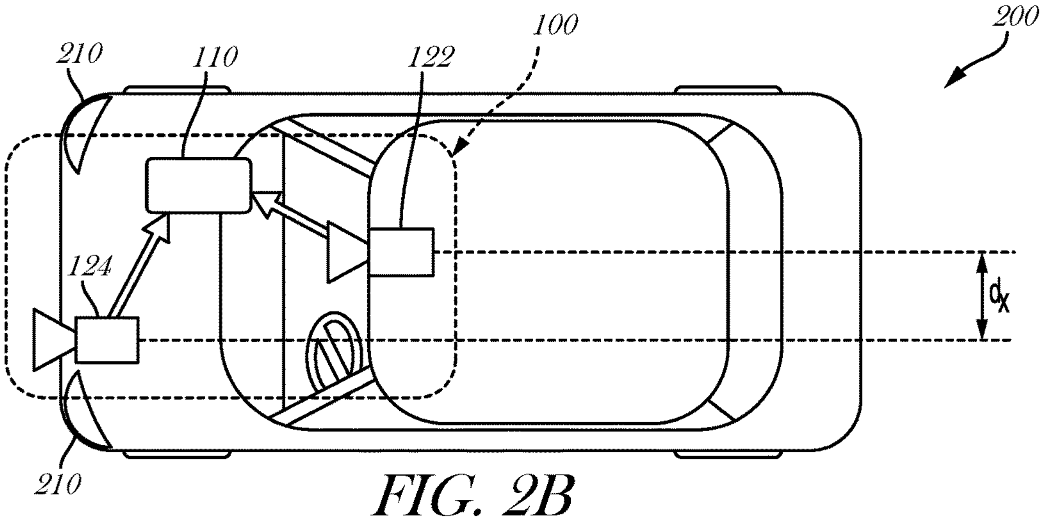
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
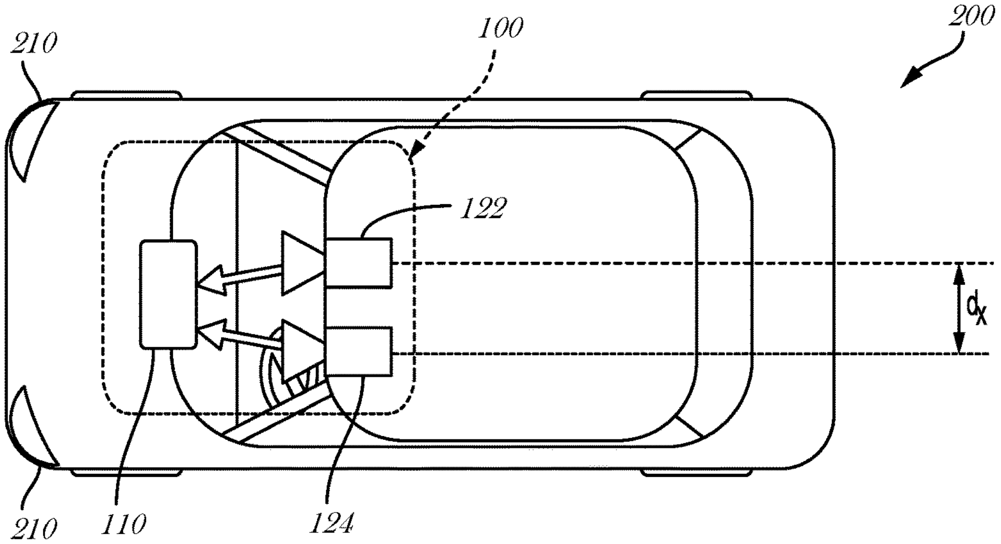
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
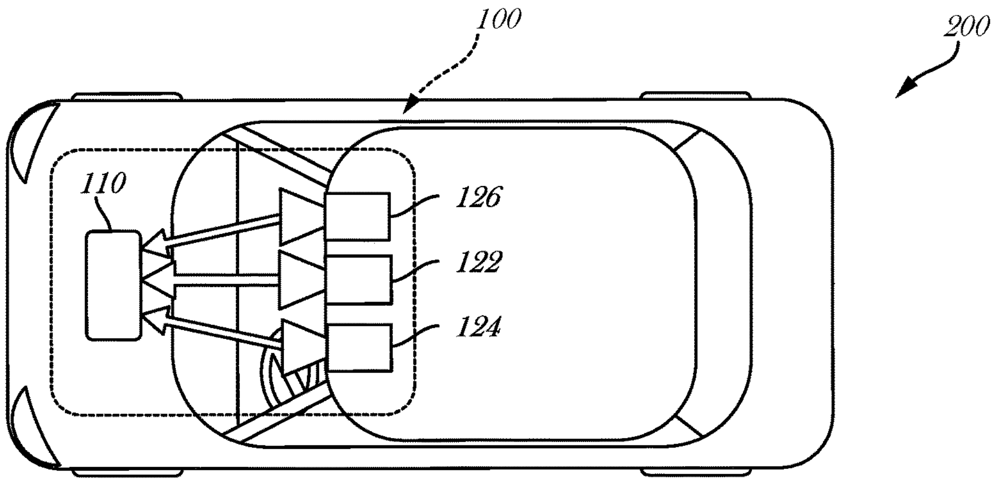
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
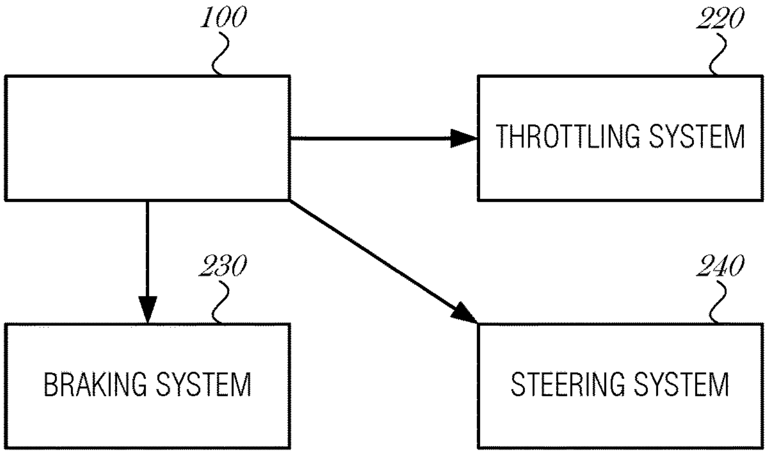
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
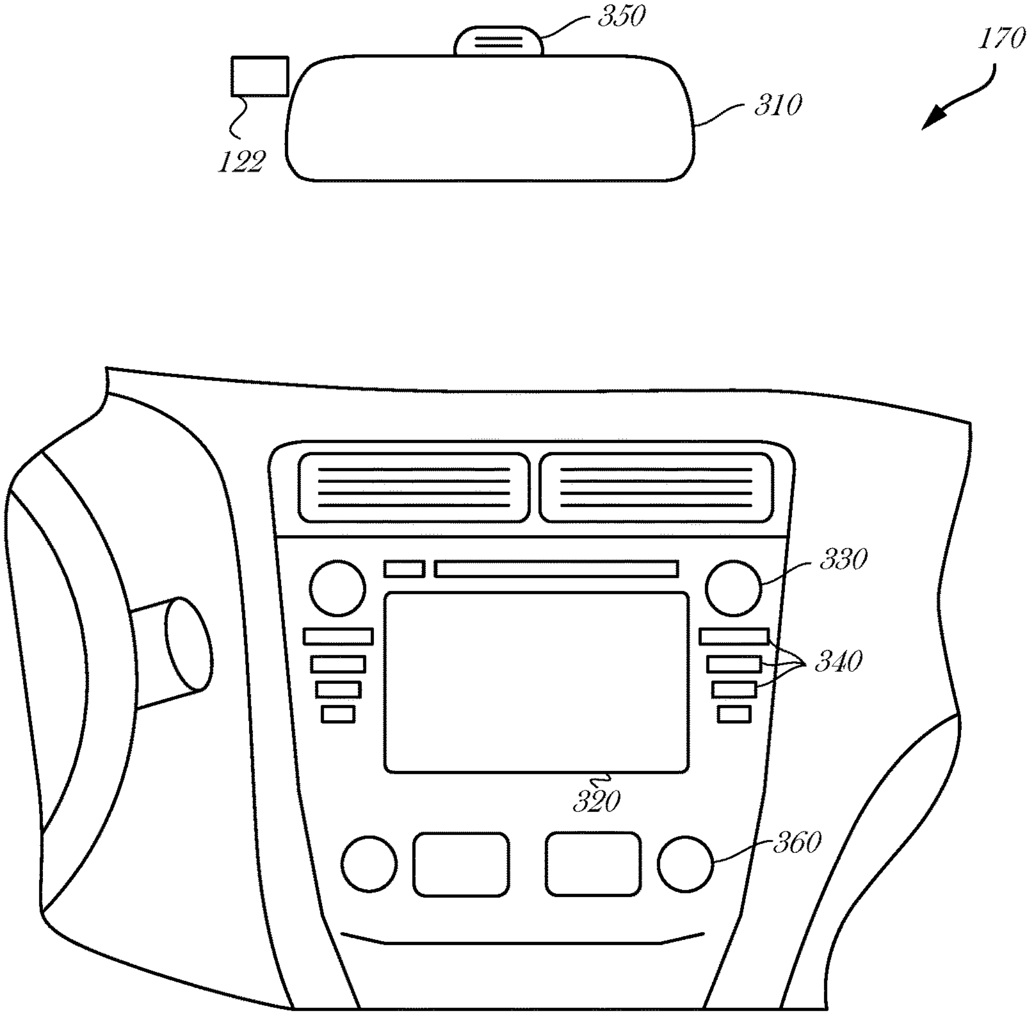
FIG. 3 is a diagrammatic representation of an interior of a vehicle including a rearview mirror and a user interface for a vehicle imaging system consistent with the disclosed embodiments.

As shown in FIG. 3, the vehicle may also include a user interface 170 for interacting with a driver or a passenger of vehicle. For example, user interface 170 in a vehicle application may include a touch screen 320, knobs 330, buttons 340, and a microphone 350. A driver or passenger of the vehicle may also use handles (e.g., located on or near the steering column of the vehicle including, for example, turn signal handles), buttons (e.g., located on the steering wheel of the vehicle), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of the vehicle and, in response to this analysis, navigate and/or otherwise control and/or operate the vehicle. Navigation, control, and/or operation of the vehicle may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside the vehicle, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in the vehicle. System 100 may collect the data for analysis from, for example, image acquisition unit 120, position sensor 130, and other sensors. Further, system 100 may analyze the collected data to determine whether or not the vehicle should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of the vehicle (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Evaluating an Accuracy of Compiler

Driving related applications such as autonomous driving application and driver assistant applications are executed by vehicle driving compatible processors. There are usually one or few vehicle driving compatible processors per vehicle that execute the driving related application. The vehicle driving compatible processor is tailored to execute a driving related application. The EyeQ™ series of processor chips available from Mobileye® are non-limiting examples of vehicle driving compatible processors.

The driving related application must be evaluated by processing vast amounts of sensed data acquired during driving sessions. The vast amounts of the sensed data may be obtained during different situations and can indicate whether an autonomous driving application operates properly at different situations and/or whether a driver autonomous driving application operates properly at different situations and/or whether a driver assistance application operates properly at different situations.

The need to process vast amounts of sensed data may require to test a high level language computer code (which is a driving related computer code) by a testing environment that include a vast number (for example hundreds, thousands and even more) of testing environment compatible processors.

The testing requires that the high level language computer code is compiled by a testing environment compatible compiler to provide a second target language computer to be executed by testing environment compatible processors.

An example of a testing environment compatible processor is the x86 processors that are configured to execute a family of instruction set architectures initially developed by Intel based on the Intel 8086 microprocessor and its 8088 variant. The 8086 was introduced in 1978 as a fully 16-bit extension of Intel's 8-bit 8080 microprocessor, with memory segmentation as a solution for addressing more memory than can be covered by a plain 16-bit address. The term "x86" came into being because the names of several successors to Intel's 8086 processor end in "86", including the 80186, 80286, 80386, and 80486 processors.

Many additions and extensions have been added to the x86 instruction set over the years, almost consistently with full backward compatibility. The architecture has been implemented in processors from Intel and many other companies.

As of 2018, the majority of personal computers and laptops sold are based on the x86 architecture. At the high end, x86 continues to dominate compute-intensive workstation and cloud computing segments.

The driving related applications include various floating point operations. A floating-point arithmetic (FP) is arithmetic using formulaic representation of real numbers as an approximation to support a trade-off between range and precision. For this reason, floating-point computation is often found in systems which include very small and very large real numbers, which require fast processing times. A number is, in general, represented approximately to a fixed number of significant digits (the significand) and scaled using an exponent in some fixed base; the base for the scaling is normally two, ten, or sixteen. A number that can be represented exactly is of the following form: $\text{SIGNIFICAND}\times\text{BASE}^{\text{EXPONENT}}$.

Where significand is an integer, base is an integer greater than or equal to two, and exponent is also an integer.

The term floating point refers to the fact that a number's radix point (decimal point, or, more commonly in computers, binary point) can "float"; that is, it can be placed anywhere relative to the significant digits of the number. This position is indicated as the exponent component, and thus the floating-point representation can be thought of as a kind of scientific notation.

A floating-point system can be used to represent, with a fixed number of digits, numbers of different orders of magnitude: e.g. the distance between galaxies or the diameter of an atomic nucleus can be expressed with the same unit of length. The result of this dynamic range is that the numbers that can be represented are not uniformly spaced; the difference between two consecutive representable numbers grows with the chosen scale.

While floating-point addition type operations (such as addition and multiplication operations) are both commutative ($a+b=b+a$ and $a\times b=b\times a$), they are not necessarily associative. That is, $(a+b)+c$ is not necessarily equal to $a+(b+c)$.

The non-associative nature of the floating-point addition type operations may introduce a difference between the outcome of the testing and an outcome of an execution of a vehicle related program by a vehicle driving compatible processor.

The difference may be introduced due to differences between the vehicle driving compatible compiler and the testing environment compatible compiler; and especially differences between the order of execution of addition-type floating-point operations introduced by the different compliers. There is a growing need to allow the efficient testing by a testing environment while effectively determining whether the testing is accurate.

Figure 4:
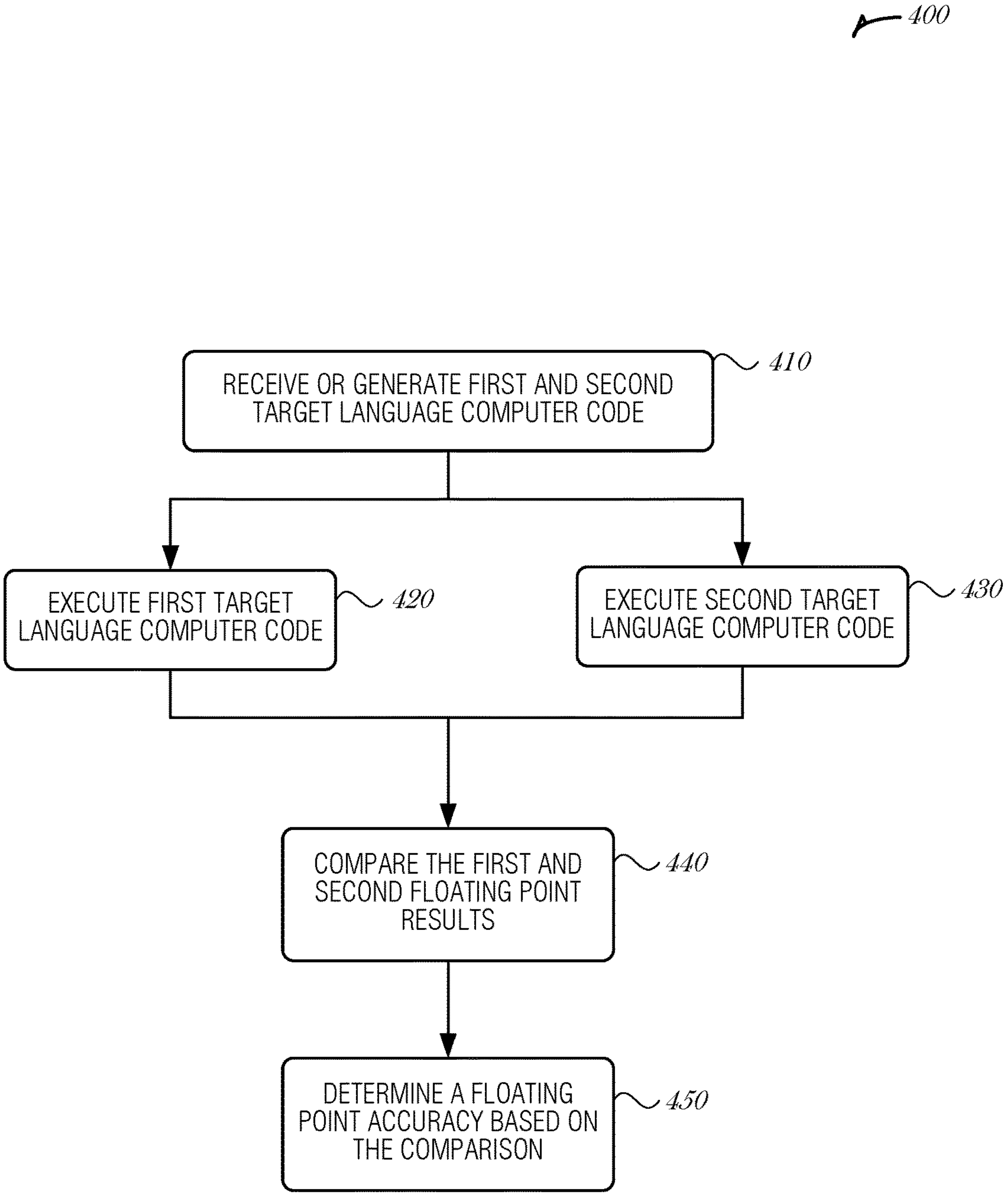
FIG. 4 illustrates an example of a method.

FIG. 4 illustrates a method 400 for evaluating a floating-point accuracy of a vehicle driving compatible compiler. Method 400 may start by step 410 of receiving or generating a first target language computer code and a second target language computer code.

The first target language computer code is generated by compiling a high-level language computer code by a vehicle driving compatible compiler.

The second target language computer code is generated by compiling the high-level language computer code by a testing environment compatible compiler.

The high-level language computer code should be free from programmer constraints regarding an order of execution of addition-type floating-point operations.

The high-level language computer code should be free from programmer constraints regarding an order of execution of addition-type floating-point operations in order to enable each one of the testing environment compatible compiler and the vehicle driving compatible compiler to determine the order of execution of addition-type floating-point operations.

Step 410 may be followed by steps 420 and 430.

Step 420 may include executing the first target language computer code by one or more vehicle driving compatible processors. The executing of the first target language computer code involves executing addition type floating points operations to provide a first floating point result.

Step 430 may include executing the second target language computer code by one or more testing environment compatible processors that differ by architecture from the one or more vehicle driving compatible processors. The executing of the second target language computer code involves executing addition type floating points operations to provide a second floating point result that corresponds to the first floating point result.

Steps 420 and 430 may be followed by step 440 of comparing the first floating point result to the second floating point results to provide a comparison result.

Step 440 may be followed by step 450 of determining the floating-point accuracy of vehicle driving compatible compiler based on the comparison result.

Step 450 may include determining that the vehicle driving compatible compiler has an inadequate floating-point accuracy when the first floating point result differs from the first floating point result.

Due to the non-associative nature of the addition-type floating-point operations, a difference in the results indicates that (a) the order of execution of the addition-type floating-point operations of the first target language computer code differs from (b) the order of execution of the second target language computer code.

The addition-type floating points operations may be addition floating point operations and/or multiplication floating point operations.

The testing environment compatible compiler is independently developed from the vehicle driving compatible compiler. The independent development may include using different development tolls, different development personnel, and the like.

The independent development guarantees that the environment compatible compiler is independent from the vehicle driving compatible compiler.

The one or more testing environment compatible processors are better fit to execute distributed processing than the one or more vehicle driving compatible processors. Better fit means that they may have more resources that are devoted to exchange data between vehicle driving compatible processors, or otherwise more efficient in executing a distributed process that is shared between very large numbers of testing environment compatible processors.

For example, the testing environment compatible processors may be x86 compatible, may be general purpose processors, may be tailored to operate in large data centers, and the like.

The vehicle driving compatible processors may be tailored to perform at least one out of (a) autonomous driving applications and/or (b) driving assistance applications. Such vehicle driving compatible processors may be application specific or purposefully designed for vehicle driving processing. The vehicle driving compatible processors may include more hardware resources that are tailored to perform driving related applications and may be less suited for executing other types of applications. The one or more vehicle driving compatible processors may be autonomous driving hardware accelerators and/or driver assistant hardware accelerators.

Figure 5:
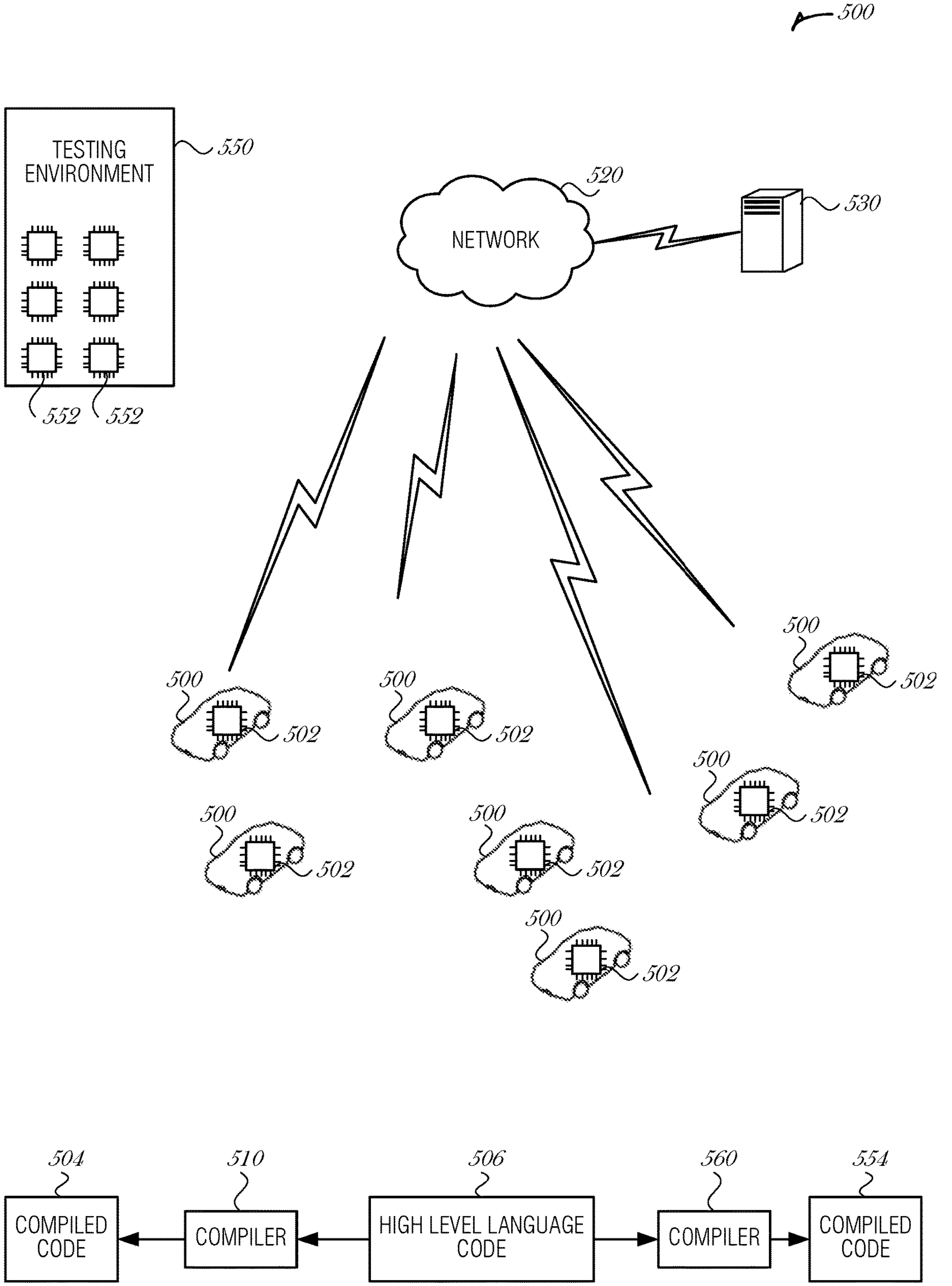
FIG. 5 illustrates vehicles and a testing environment.

FIG. 5 illustrates vehicles 500 and a testing environment 550. Vehicles 500 include vehicle driving compatible processors 502 (usually one or few vehicle driving compatible processors per vehicle). The vehicle driving compatible processors 502 execute a first target language computer code 504 that is generated by compiling a high-level language computer code 506 by a vehicle driving compatible compiler 510.

The vehicles 500 may send sensed information, via network 520, to storage and processing resources 530 for evaluating the driving related processors.

Testing environment 550 includes a vast number of testing environment compatible processors 552. The testing environment compatible processors differ by architecture from the one or more vehicle driving compatible processors 502. The testing environment compatible processors 552 execute a second target language computer code 554 that is generated by compiling a high-level language computer code 506 by a testing environment compatible compiler 560.

Figure 6:
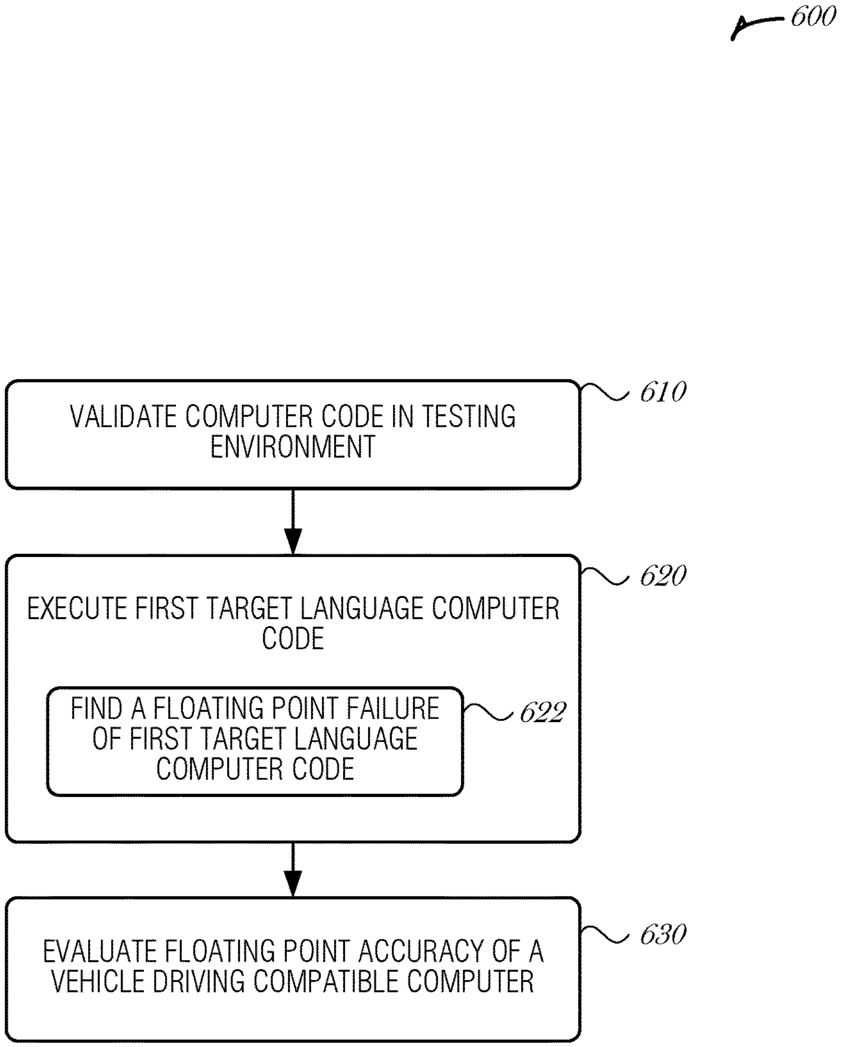
FIG. 6 illustrates an example of a method.

FIG. 6 illustrates an example of method 600.

Method 600 may start by step 610 of validating a high level computer code.

The validating includes running a second target language computer code on a testing environment that may include a vast number (for example, more than 10, 100, 1000, 10000, and the like) of testing environment compatible processors. The second target language code is generated by compiling the high-level language computer code by a testing environment compatible compiler.

Step 610 may be executed by the vendor of the vehicle driving compatible processors or by another entity.

If step 610 succeeds, then step 610 may be followed by step 620 of executing a first target language computer code by multiple vehicle driving compatible processors.

The first target language computer code is generated by compiling the high-level language computer code by a vehicle driving compatible compiler.

Step 620 may be executed by the vendor of the vehicle driving compatible processors, or by another entity, for example, an owner of a fleet of vehicles, a vehicle manufacturer, and the like.

Step 620 may include finding a floating point failure of the first target language computer code (step 622).

Step 620 may be followed by step 630 of evaluating a floating-point accuracy of a vehicle driving compatible compiler. Step 630 may include method 400.

Although the previous examples and text referred to checking floating-point accuracy of one or more compilers, it should be noted that any of the mentioned above methods, systems, and non-transitory computer readable code may be used for finding any other differences between different compilers that are used to compile the same high-level language computer code.

Any machine language program mentioned above may be executed by the processing unit 110 of FIGS. 2A-2D, or by any processor that may include one or more processing circuits. A processing circuit may include one or more field programmable gate arrays (FPGAs), one of more graphical processing units (GPUs), one of more general purpose units, one of more central processing units (CPUs), one or more hardware accelerators, one or more integrated circuits, and the like.

Any of method describing steps may include more steps than those illustrated in the figure, only the steps illustrated in the figure or substantially only the steps illustrated in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit or processing circuitry, associated memory and a number of input/output (I/O) devices. When executing the computer program, the computer system processes information according to the computer program and produces resultant output information via I/O devices.

EXAMPLES

Example 1 is a system for evaluating a floating-point accuracy of a vehicle driving compatible compiler, comprising: processing circuitry; and memory to store instructions, which when executed by the processing circuitry, cause the processing circuitry to perform operations comprising: receiving or generating a first target language computer code and a second target language computer code, the first target language computer code generated by compiling a high-level language computer code by a vehicle driving compatible compiler, the second target language computer code generated by compiling the high-level language computer code by a testing environment compatible compiler, the high-level language computer code is free from programmer constraints regarding an order of execution of addition-type floating-point operations; executing the first target language computer code by one or more vehicle driving compatible processors, the executing of the first target language computer code involving executing addition type floating points operations to provide a first floating point result; executing the second target language computer code by one or more testing environment compatible processors that differ by architecture from the one or more vehicle driving compatible processors, the executing of the second target language computer code involving executing addition type floating points operations to provide a second floating point result that corresponds to the first floating point result; comparing the first floating point result to the second floating point results to provide a comparison result; and determining the floating-point accuracy of vehicle driving compatible compiler based on the comparison result.

In Example 2, the subject matter of Example 1 includes, wherein the memory comprises instructions for determining that the vehicle driving compatible compiler has an inadequate floating-point accuracy when the first floating points results differs from the first floating point results.

In Example 3, the subject matter of Examples 1-2 includes, wherein the addition type floating points operations comprise addition floating point operations and multiplication floating point operations.

In Example 4, the subject matter of Examples 1-3 includes, wherein the testing environment compatible compiler is independently developed from the vehicle driving compatible compiler.

In Example 5, the subject matter of Examples 1-4 includes, wherein the one or more testing environment compatible processors are better fit to execute distributed processing than the one or more vehicle driving compatible processors.

In Example 6, the subject matter of Examples 1-5 includes, wherein the one or more testing environment compatible processors are general purpose processors and wherein the one or more vehicle driving compatible processors are at least one of: autonomous driving hardware accelerators and driver assistant hardware accelerators.

In Example 7, the subject matter of Examples 1-6 includes, wherein the evaluating of the floating point accuracy is preceded by (a) validating the high-level computer code using a testing environment that executes the second target language computer code, (b) following a successful validation, executing the first target language computer code by multiple vehicle driving compatible processors, and (c) finding a floating point failure of the second target language computer code.

Example 8 is a method for evaluating a floating-point accuracy of a vehicle driving compatible compiler, the method comprising: receiving or generating a first target language computer code and a second target language computer code, the first target language computer code generated by compiling a high-level language computer code by a vehicle driving compatible compiler, the second target language computer code generated by compiling the high-level language computer code by a testing environment compatible compiler, the high-level language computer code is free from programmer constraints regarding an order of execution of addition-type floating-point operations; executing the first target language computer code by one or more vehicle driving compatible processors, the executing of the first target language computer code involving executing addition type floating points operations to provide a first floating point result; executing the second target language computer code by one or more testing environment compatible processors that differ by architecture from the one or more vehicle driving compatible processors, the executing of the second target language computer code involving executing addition type floating points operations to provide a second floating point result that corresponds to the first floating point result; comparing the first floating point result to the second floating point results to provide a comparison result; and determining the floating-point accuracy of vehicle driving compatible compiler based on the comparison result.

In Example 9, the subject matter of Example 8 includes, determining that the vehicle driving compatible compiler has an inadequate floating-point accuracy when the first floating points results differs from the first floating point results.

In Example 10, the subject matter of Examples 8-9 includes, wherein the addition type floating points operations comprise addition floating point operations and multiplication floating point operations.

In Example 11, the subject matter of Examples 8-10 includes, wherein the testing environment compatible compiler is independently developed from the vehicle driving compatible compiler.

In Example 12, the subject matter of Examples 8-11 includes, wherein the one or more testing environment compatible processors are better fit to execute distributed processing than the one or more vehicle driving compatible processors.

In Example 13, the subject matter of Examples 8-12 includes, wherein the one or more testing environment compatible processors are general purpose processors and wherein the one or more vehicle driving compatible processors are at least one of: autonomous driving hardware accelerators and driver assistant hardware accelerators.

In Example 14, the subject matter of Examples 8-13 includes, wherein the evaluating of the floating point accuracy is preceded by (a) validating the high-level computer code using a testing environment that executes the second target language computer code, (b) following a successful validation, executing the first target language computer code by multiple vehicle driving compatible processors, and (c) finding a floating point failure of the second target language computer code.

Example 15 is a non-transitory computer readable medium including instructions for evaluating a floating-point accuracy of a vehicle driving compatible compiler, which when executed by processing circuitry, cause the processing circuitry to perform operations comprising: receiving or generating a first target language computer code and a second target language computer code, the first target language computer code generated by compiling a high-level language computer code by a vehicle driving compatible compiler, the second target language computer code generated by compiling the high-level language computer code by a testing environment compatible compiler, the high-level language computer code is free from programmer constraints regarding an order of execution of addition-type floating-point operations; executing the first target language computer code by one or more vehicle driving compatible processors, the executing of the first target language computer code involving executing addition type floating points operations to provide a first floating point result; executing the second target language computer code by one or more testing environment compatible processors that differ by architecture from the one or more vehicle driving compatible processors, the executing of the second target language computer code involving executing addition type floating points operations to provide a second floating point result that corresponds to the first floating point result; comparing the first floating point result to the second floating point results to provide a comparison result; and determining the floating-point accuracy of vehicle driving compatible compiler based on the comparison result.

In Example 16, the subject matter of Example 15 includes, instructions for determining that the vehicle driving compatible compiler has an inadequate floating-point accuracy when the first floating points results differs from the first floating point results.

In Example 17, the subject matter of Examples 15-16 includes, wherein the addition type floating points operations comprise addition floating point operations and multiplication floating point operations.

In Example 18, the subject matter of Examples 15-17 includes, wherein the testing environment compatible compiler is independently developed from the vehicle driving compatible compiler.

In Example 19, the subject matter of Examples 15-18 includes, wherein the one or more testing environment compatible processors are better fit to execute distributed processing than the one or more vehicle driving compatible processors.

In Example 20, the subject matter of Examples 15-19 includes, wherein the one or more testing environment compatible processors are general purpose processors and wherein the one or more vehicle driving compatible processors are at least one of: autonomous driving hardware accelerators and driver assistant hardware accelerators.

In Example 21, the subject matter of Examples 15-20 includes, wherein the evaluating of the floating point accuracy is preceded by (a) validating the high-level computer code using a testing environment that executes the second target language computer code, (b) following a successful validation, executing the first target language computer code by multiple vehicle driving compatible processors, and (c) finding a floating point failure of the second target language computer code.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for evaluating a floating-point accuracy of a vehicle driving compatible compiler, the system comprising:

processing circuitry; and memory to store instructions, which when executed by the processing circuitry, cause the processing circuitry to perform operations comprising:

receiving or generating a first target language computer code and a second target language computer code, the first target language computer code generated by compiling a high-level language computer code by a vehicle driving compatible compiler designed for vehicle driving applications, the second target language computer code generated by compiling the high-level language computer code by a testing environment compatible compiler designed for a general testing environment, the vehicle driving compatible compiler different from the testing environment compatible compiler, the high-level language computer code is free from programmer constraints regarding an order of execution of addition-type floating-point operations to enable floating point operation comparison between the vehicle driving compatible compiler and the testing environment compatible compiler;

executing the first target language computer code by one or more vehicle driving compatible processors, the executing of the first target language computer code involving executing addition type floating point operations to provide a first floating point result;

executing the second target language computer code by one or more testing environment compatible processors that differ by architecture from the one or more vehicle driving compatible processors, the executing of the second target language computer code involving executing addition type floating point operations to provide a second floating point result that corresponds to the first floating point result;

comparing the first floating point result to the second floating point result to provide a comparison result, the comparison result indicating a compiler optimization difference between the vehicle driving compatible compiler and the testing environment compatible compiler arising from different orders of execution of the addition-type floating-point operations determined by the respective compilers, wherein the comparison result is used to evaluate differences attributable to compiler optimization of the order of execution of the addition-type floating-point operations; and determining the floating-point accuracy of vehicle driving compatible compiler based on the comparison result.

2. The system according to claim 1, wherein the memory comprises instructions for determining that the vehicle driving compatible compiler has an inadequate floating-point accuracy when the first floating point result differs from the second floating point result.

3. The system according to claim 1, wherein:

executing the first target language computer code comprises executing a plurality of floating point operations by a plurality of vehicle driving compatible processors to provide the first floating point result;

executing the second target language computer code comprises executing the plurality of floating point operations by a plurality of testing environment compatible processors to provide the second floating point result; and determining the floating point accuracy comprises determining that an order of execution of the addition-type floating-point operations of the first target language computer code differs from an order of execution of the addition-type floating-point operations of the second target language computer code.

4. The system according to claim 1, wherein the testing environment compatible compiler is independently developed from the vehicle driving compatible compiler.

5. The system according to claim 1, wherein the one or more testing environment compatible processors are better fit to execute distributed processing than the one or more vehicle driving compatible processors.

6. The system according to claim 1, wherein the one or more testing environment compatible processors are general purpose processors and wherein the one or more vehicle driving compatible processors are at least one of: autonomous driving hardware accelerators and driver assistant hardware accelerators.

7. The system according to claim 1, wherein the evaluating of the floating point accuracy is preceded by (a) validating the high-level computer code using a testing environment that executes the second target language computer code, (b) following a successful validation, executing the first target language computer code by multiple vehicle driving compatible processors, and (c) finding a floating point failure of the second target language computer code.

8. The system according to claim 1, wherein the compiler optimization difference comprises a compiler-introduced order-of-execution difference in which the vehicle driving compatible compiler determines a first order of execution of the addition-type floating-point operations and the testing environment compatible compiler determines a different second order of execution of the addition-type floating-point operations.

9. The system according to claim 1, wherein the operations further comprise determining, based on the comparison result, that a first order of execution of the addition-type floating-point operations determined by the vehicle driving compatible compiler during compilation differs from a second order of execution of the addition-type floating-point operations determined by the testing environment compatible compiler during compilation.

10. A method for evaluating a floating-point accuracy of a vehicle driving compatible compiler, the method comprising:

receiving or generating a first target language computer code and a second target language computer code, the first target language computer code generated by compiling a high-level language computer code by a vehicle driving compatible compiler designed for vehicle driving applications, the second target language computer code generated by compiling the high-level language computer code by a testing environment compatible compiler designed for a general testing environment, the vehicle driving compatible compiler different from the testing environment compatible compiler, the high-level language computer code is free from programmer constraints regarding an order of execution of addition-type floating-point operations to enable floating point operation comparison between the vehicle driving compatible compiler and the testing environment compatible compiler;

executing the first target language computer code by one or more vehicle driving compatible processors, the executing of the first target language computer code involving executing addition type floating point operations to provide a first floating point result;

executing the second target language computer code by one or more testing environment compatible processors that differ by architecture from the one or more vehicle driving compatible processors, the executing of the second target language computer code involving executing addition type floating point operations to provide a second floating point result that corresponds to the first floating point result;

comparing the first floating point result to the second floating point result to provide a comparison result, the comparison result indicating a compiler optimization difference between the vehicle driving compatible compiler and the testing environment compatible compiler arising from different orders of execution of the addition-type floating-point operations determined by the respective compilers, wherein the comparison result is used to evaluate differences attributable to compiler optimization of the order of execution of the addition-type floating-point operations; and determining the floating-point accuracy of vehicle driving compatible compiler based on the comparison result.

11. The method according to claim 10, comprising determining that the vehicle driving compatible compiler has an inadequate floating-point accuracy when the first floating point result differs from the second floating point result.

12. The method according to claim 10, wherein:

executing the first target language computer code comprises executing a plurality of floating point operations by a plurality of vehicle driving compatible processors to provide the first floating point result;

executing the second target language computer code comprises executing the plurality of floating point operations by a plurality of testing environment compatible processors to provide the second floating point result; and determining the floating point accuracy comprises determining that an order of execution of the addition-type floating-point operations of the first target language computer code differs from an order of execution of the addition-type floating-point operations of the second target language computer code.

13. The method according to claim 10, wherein the testing environment compatible compiler is independently developed from the vehicle driving compatible compiler.

14. The method according to claim 10, wherein the one or more testing environment compatible processors are better fit to execute distributed processing than the one or more vehicle driving compatible processors.

15. The method according to claim 10, wherein the one or more testing environment compatible processors are general purpose processors and wherein the one or more vehicle driving compatible processors are at least one of: autonomous driving hardware accelerators and driver assistant hardware accelerators.

16. The method according to claim 10, wherein the evaluating of the floating point accuracy is preceded by (a) validating the high-level computer code using a testing environment that executes the second target language computer code, (b) following a successful validation, executing the first target language computer code by multiple vehicle driving compatible processors, and (c) finding a floating point failure of the second target language computer code.

17. A non-transitory computer readable medium including instructions for evaluating a floating-point accuracy of a vehicle driving compatible compiler, which when executed by processing circuitry, cause the processing circuitry to perform operations comprising:

receiving or generating a first target language computer code and a second target language computer code, the first target language computer code generated by compiling a high-level language computer code by a vehicle driving compatible compiler designed for vehicle driving applications, the second target language computer code generated by compiling the high-level language computer code by a testing environment compatible compiler designed for a general testing environment, the vehicle driving compatible compiler different from the testing environment compatible compiler, the high-level language computer code is free from programmer constraints regarding an order of execution of addition-type floating-point operations to enable floating point operation comparison between the vehicle driving compatible compiler and the testing environment compatible compiler;

executing the first target language computer code by one or more vehicle driving compatible processors, the executing of the first target language computer code involving executing addition type floating point operations to provide a first floating point result;

executing the second target language computer code by one or more testing environment compatible processors that differ by architecture from the one or more vehicle driving compatible processors, the executing of the second target language computer code involving executing addition type floating point operations to provide a second floating point result that corresponds to the first floating point result;

comparing the first floating point result to the second floating point result to provide a comparison result, the comparison result indicating a compiler optimization difference between the vehicle driving compatible compiler and the testing environment compatible compiler arising from different orders of execution of the addition-type floating-point operations determined by the respective compilers, wherein the comparison result is used to evaluate differences attributable to compiler optimization of the order of execution of the addition-type floating-point operations; and determining the floating-point accuracy of vehicle driving compatible compiler based on the comparison result.

18. The non-transitory computer readable medium according to claim 17, comprising instructions for determining that the vehicle driving compatible compiler has an inadequate floating-point accuracy when the first floating point result differs from the second floating point result.

19. The non-transitory computer readable medium according to claim 17, wherein:

executing the first target language computer code comprises executing a plurality of floating point operations by a plurality of vehicle driving compatible processors to provide the first floating point result;

executing the second target language computer code comprises executing the plurality of floating point operations by a plurality of testing environment compatible processors to provide the second floating point result; and determining the floating point accuracy comprises determining that an order of execution of the addition-type floating-point operations of the first target language computer code differs from an order of execution of the addition-type floating-point operations of the second target language computer code.

20. The non-transitory computer readable medium according to claim 17, wherein the testing environment compatible compiler is independently developed from the vehicle driving compatible compiler.

21. The non-transitory computer readable medium according to claim 17, wherein the one or more testing environment compatible processors are better fit to execute distributed processing than the one or more vehicle driving compatible processors.

22. The non-transitory computer readable medium according to claim 17, wherein the one or more testing environment compatible processors are general purpose processors and wherein the one or more vehicle driving compatible processors are at least one of: autonomous driving hardware accelerators and driver assistant hardware accelerators.

23. The non-transitory computer readable medium according to claim 17, wherein the evaluating of the floating point accuracy is preceded by (a) validating the high-level computer code using a testing environment that executes the second target language computer code, (b) following a successful validation, executing the first target language computer code by multiple vehicle driving compatible processors, and (c) finding a floating point failure of the second target language computer code.

* * * * *